Sept. 23, 1947. W. F. SCHMIED 2,427,880
IMPLEMENT DRIVE LOCK DEVICE
Filed Dec. 18, 1943 2 Sheets-Sheet 2
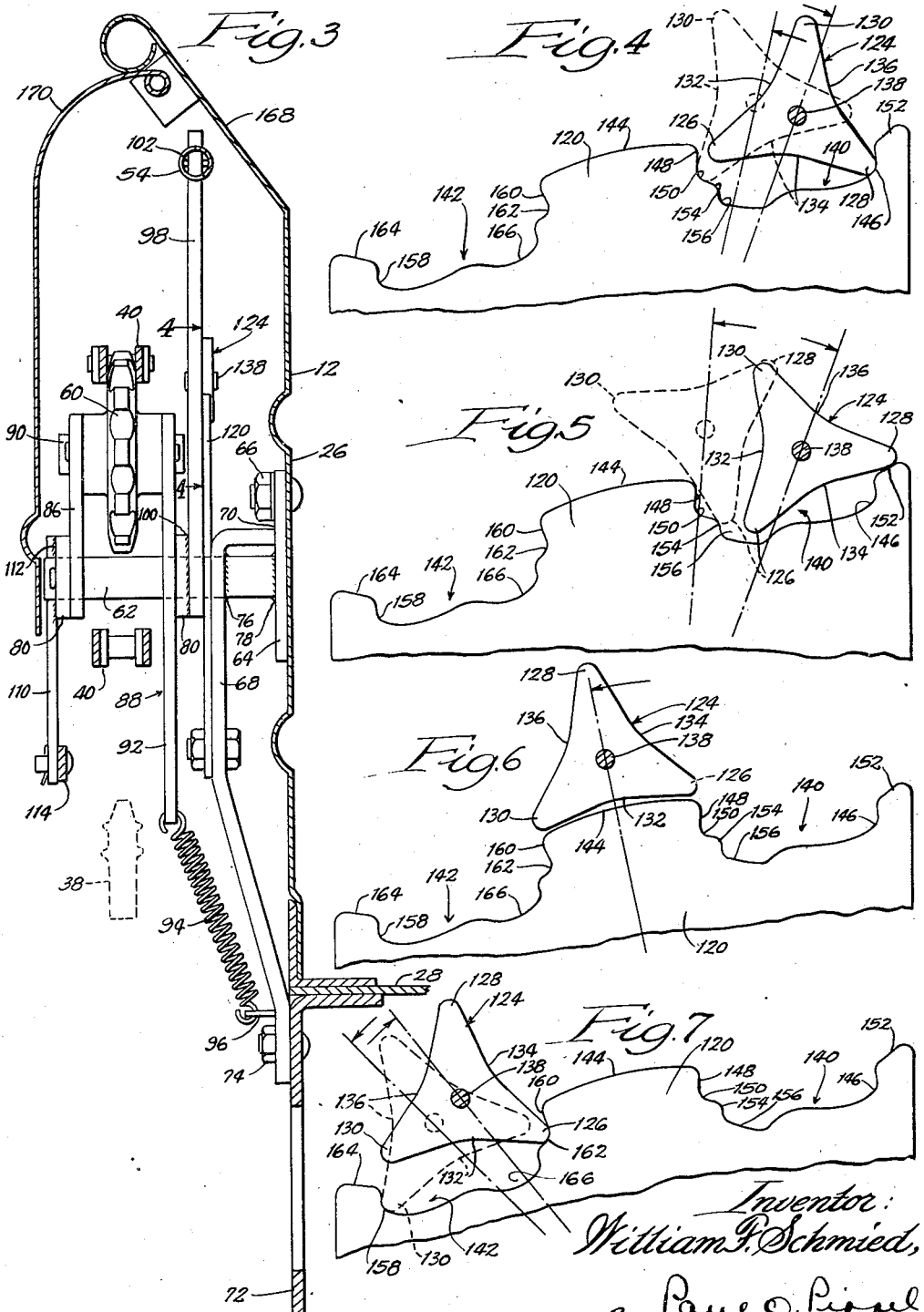

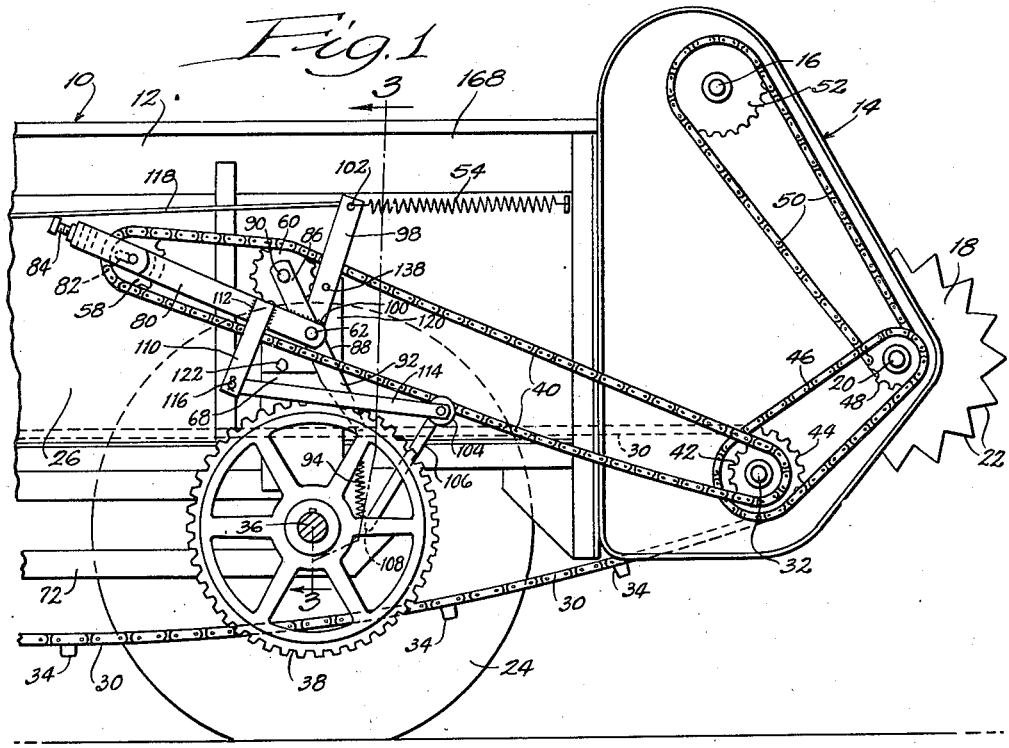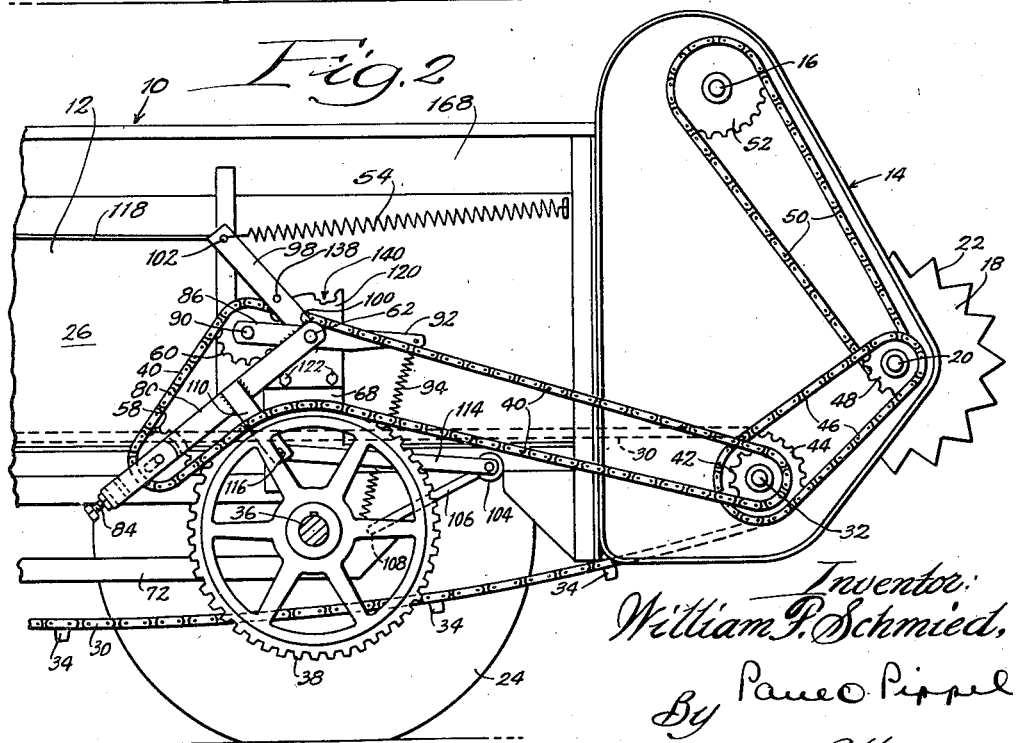

Patented Sept. 23, 1947

2,427,880

UNITED STATES PATENT OFFICE 2,427,880

IMPLEMENT DRIVE LOCK DEVICE

William F. Schmied, Blue Island, Ill., assignor to International Harvester Company, a corporation of New Jersey Application December 18, 1943, Serial No. 514,781

8 Claims. (Cl. 74—221)

1

This invention relates to a new and novel implement drive lock, and has for one of its principal objects the provision of means for locking an implement drive chain in driving or non-driving position.

An important object of this invention is to provide a positive lock for the implement drive chain in disengaged position and, in combination therewith, a positive locking means for locking the implement drive chain in engaged driving position.

Another important object of this invention is to provide an improved drive chain locking device for agricultural implements which may be engaged or disengaged with the driving mechanism merely by successive pulling and releasing of a pull cord.

A still further important object is to provide an agricultural implement drive chain resiliently maintained in non-driving position.

At the present time, agricultural implements of the manure-spreader type employ driving chains adapted to engage a driving sprocket and also adapted to be raised from the driving sprocket by some manual lifting means. The driving chain normally engages the driving sprocket until such time as it is lifted and released therefrom.

It is a particular object of the present invention to provide a similar driving chain for manure spreaders which is normally disengaged from the driving sprocket.

Another and still further important object is to provide a manure spreader having the usual driving chain adapted to engage and disengage a driving sprocket and, further, to lock the driving chain in engaged or disengaged position.

Still another important object of this invention is to provide a locking means for a manure-spreader drive which is capable of maintaining a driving chain in engaged driving position and which is capable of maintaining the driving chain in non-driving position, all by means of a single lock which is operable by a single pull cord.

Other and further important objects of this invention will become apparent from the following detailed description and accompanying sheets of drawings, in which—

Figure 1 is a partial side elevation of the manure spreader of this invention with one of the wheels removed and showing the drive-chain mechanism in non-driving position;

Figure 2 is a view similar to Figure 1, showing the drive-chain mechanism in driving position;

Figure 3 is a sectional view taken on the line 3—3 of Figure 1;

Figure 4 is a detail of the drive-chain locking mechanism and is a view taken on the line 4—4 of Figure 3; and Figures 5, 6, and 7 are views similar to Figure 4, showing the locking mechanism in successive operating positions.

Referring now to the drawings, the reference numeral 10 indicates generally a manure spreader having a cart, wagon or body portion 12 and a spreader unit 14 positioned at the rear end of the cart.

The spreader unit 14 comprises means for beating, agitating, and distributing manure fed to the spreader unit from the wagon portion 12. The particular means employed in the spreader unit are not shown in detail, but it is to be understood that a beater (not shown) is rotatable on a shaft 16, and an auger 18, partially shown, is mounted on a shaft 20. This wide-spreading auger 18 in the present instance is shown as having a sawtooth periphery at 22. The means for feeding manure from the wagon to the spreader unit comprises an endless slatted chain conveyer 30.

The wagon 12 has at least one pair of wheels 24, one of which has been removed from the drawings to more adequately show the parts of the invention. The wagon itself has sides 26 and a bottom 28. The conveyer chains 30 are mounted on sprockets on a shaft 32 in the spreader unit and have cross slats 34 extending between the chains 30 at regular intervals around the periphery thereof to carry manure at the bottom of the wagon to the spreader unit 14, where it is thrown to the ground by the wide-spreading auger 18. The conveyer chains 30 are adapted to run on the bottom 28 of the wagon 12.

The wheels 24 are mounted on an axle 36. As the manure spreader is drawn by a tractor or other drive means, the axle 36 is rotated. A sprocket 38 is keyed to the axle 36 and upon movement of the manure spreader the sprocket 38 turns with the wheels and the axle 36. The sprocket 38 is adapted to impart rotation to the shafts 16, 20, and 32 in the spreader unit 14. A driving chain 40, as best shown in Figure 2, is engageable with the sprocket 38 and drives a sprocket 42 on the shaft 32. A second sprocket 44 on the same shaft 32 is adapted to drive a chain 46, which joins a sprocket 48 on the shaft 20. Similarly, the shaft 16 is given rotation by means of a chain 50 which surrounds a second sprocket on the shaft 20 and a sprocket 52 on the shaft 16.

Normally, the drive chain 40 is held in the upper position, as shown in Figure 1, by reason of a spring 54. The driving chain 40 extends around the sprocket 42 on the shaft 32 and around sprockets 58 and 60. By means of a plurality of lever arms, it is possible to shift the driving chain 40 from its non-engaging sprocket position, as shown in Figure 1, to the engaged sprocket position shown in Figure 2.

As best shown in Figure 3, a stub shaft 62 is welded to an auxiliary plate 64 fastened to the wagon side wall 26 by bolts or the like 66. An additional bracket member 68 is attached to the auxiliary side plate 64 at 70 and to the wheel-supporting depending bracket 72 at 74 by means of a bolt or the like. The stub shaft 62 is shown extending through the bracket 68 and welded at 76 and 78. One lever arm 80 supports the sprocket 58 within a slot 82. Adjustment means 84 is mounted on the end of the lever 80 for the purpose of shifting the sprocket 58 within the slot 82. The particular details of this adjusting mechanism are not shown for the reason that they form no part of the present invention and could be made in a number of ways. A second lever arm 86 supports the sprocket 60 and is also journaled on the shaft 62, as shown in Figures 1, 2, and 3. The sprocket 60, as best shown in Figure 3, is mounted between the pair of arms 86 and 88 and is journaled on a shaft 90 extending therebetween. The chain 40 is shown engaging this idler sprocket 60. The arm 88 is equipped with a depending extension 92 and by means of a spring 94 attached to the lower end of the bracket 68 at 96 the upper end of the arm 88 is normally impelled upwardly. The spring 94, as shown in Figure 1, is adapted to pivot the arm 88 about the shaft 62 so that the sprocket 60 is adapted to resiliently maintain tension of the chain 40.

The lever 80 has an upwardly extending arm 98 welded thereto at 100. As best shown in Figure 3, the lever arm 80 consists of two parallel sections similar to the arms 86 and 88. The upwardly-extending arm 98 is also journaled on the stub shaft 62 and has one end of the spring 54 connected to the upper end thereof at 102. It is evident, therefore, that as the lever 98 is held in a rearwardly inclined position because of the spring 54, the lever arms 80 are held in the position shown in Figure 1, with the sprocket 58 fully extended and substantially on a line with the sprockets 42 and 60.

An additional means is provided on the under side of the chain 40 to prevent it from sagging and contacting the sprocket 38 at a time when engagement is not desired. This means consists of a roller 104 mounted on an arm 106 which in turn is pivoted at 108 on the depending wheel-supporting bracket 72. A downwardly-extending arm 110 is welded to one of the levers 80, as shown at 112, and has a connecting link 114 joining the lower end thereof at 116. The other end of the link 114 joins the roller 104 and its arm 106. When the lever arms 80 are in an upper position, such as shown in Figure 1, the connecting link 114 maintains the pivot arm 106 in its upward position, thereby preventing the chain 40 from sagging and permitting unwarranted engagement with the sprocket 38.

A pull cord 118 is also attached to the upper end of the arm 98 at 102, and pulling thereof will necessarily be against the action of the spring 54. The forward end of the pull-cord 118, although not shown, is preferably positioned at some point adjacent the operator of the tractor or other draft vehicle so that the operator thereof is permitted to keep the driving chain 40 in its upper position, as shown in Figure 1, or to effect an engagement of the chain 40 with the sprocket 38 by a forward pulling of the pull-cord 118.

A plate member 120 is bolted to the bracket 68 at 122 and is adapted to carry locking means for engagement with the complementary locking means on the arm 98. However, disregarding the locking means for the moment, it will be evident that a forward pulling of the cord 118 will cause a pivotal movement of the bell-crank formed by the arms 80 and 98 about the pivotal center on the shaft 62. Such movement will effect a dropping of the forward end of the chain 40 so that the chain 40 is wrapped around the upper portion of the sprocket 38. If no locking means were available, it would be necessary to maintain the rope pull 118 under constant tension. Heretofore, instead of having a rope pull such as the one shown at 118, a solid link was employed and could be rigidly held in either forward or rearward position by means of a rack and associated detent positioned adjacent the operator. Further, prior machines did not normally maintain the drive chain 40 in an upward position by a spring such as the one shown at 54, but rather the chain 40 was held up by means of the solid link actuating lever.

The present device has a locking means for positively holding the drive chain 40 in engaged position, as shown in Figure 2. The lock is shown in greater detail in Figures 3 to 7 inclusive. A part of the lock consists of a triangularly-shaped wheel 124 having rounded apices 126, 128, and 130 and having concave sides 132, 134, and 136. The triangular wheel 124 is pivoted on the actuating upright lever 98, as best shown in Figure 3, by means of a stub shaft 138. The triangular wheel 124 is adapted to ride on the upper edge of the plate 120. The upper edge of this plate 120 has two cut-out portions 140 and 142. The cut-out portions 140 and 142 are identical in shape but are in opposite relationship with each other. A smooth curved portion 144 on the upper edge of the plate 120 joins these two cut-out portions 140 and 142.

When the drive chain is positioned as shown in Figure 1 of the drawings, the triangularly-shaped wheel is in the position shown in Figure 4 where the apex 128 of the wheel 124 is lodged within a small minor recess 146 of the large cut-out portion 140. The recess 146 has an arcuate radius closely approximating the radius of the apices 126, 128, and 130. The spring 54 maintains the apex 128 within the recess 146, and it is quite evident that if the spring should break or otherwise become inoperative, the drive chain 40 would not be permitted to drop onto the sprocket 38 but would be maintained in its upper position by reason of the apex 126 of the triangular wheel 124 striking a substantially vertical wall 148 and settling down into an arcuate recess 150 substantially the same size as the recess 146.

In order to effect a driving position of the chain 40, it is necessary to pull the rope 118 forwardly against the action of the spring 54. The effect of such forward pulling of the rope 118 is the same as that just described for a failure of the spring 54 wherein the apex 126 lodged in the recess 150, as shown by the dashed lines in Figure 4. At this point the pull rope 118 is released and the action of the spring 54 carries the arm 98 and hence the triangular wheel 124 rearwardly, and inasmuch as the triangular wheel has rotated by reason of the apex 126 sliding down the vertical wall 148 to the recess 150, the apex 128 has also rotated to a position as shown in the dotted lines, whereupon the rearward pulling of the spring 54 will carry this apex 128 above a cam end portion 152, as shown in Figure 5, which causes further rotation of the wheel 124. The spring 54 still maintains the chain 40 in its disengaged position, as shown in Figure 1. A subsequent forward pulling of the rope 118 will now, however, cause the apex 126 to strike a hump 154 adjacent a large recess 156 in the bottom of the cut-out portion 140. The resultant position of the triangular wheel 124, after a forward pulling from the position shown in Figure 5, is as shown in the dashed-line position of the triangular wheel in Figure 5. Figure 6 shows the next position of the triangular wheel 124 upon continued forward pulling of the rope 118. In such position, the concave side 132 has rolled over so that it now slidingly engages the smooth arcuate portion 124 of the upper edge of the plate 120.

The triangular wheel 124 in Figure 7 moves forwardly by a continued pulling of the rope 118 and, as shown in Figure 7, completes its forward movement as shown by the dashed-line position of the triangular wheel 124. In such position the apex 130 lodges in a recess 158, which lies in such a position that a continuation of the arcuate surface 144 would intersect such recess 158. This recess 158 is similar to the recess 146 shown in the cut-out portion 140 and performs the same function. However, inasmuch as the spring 54 continues its effectiveness in tending to pull the bell-crank 80—98 upwardly, the triangular wheel 124 does not rest in the dashed-line position of Figure 7 but rather assumes the full-line position of the wheel 124, which is similar but exactly opposite to the dashed-line position of the triangular wheel shown in Figure 4. The apex 126 strikes a vertical wall 169 similar to the wall 148 and slides down into a recess 162 similar to the recess 150, whereupon it causes some rotation of the triangular wheel 124. In this position the drive chain 40 is locked in engaged position around the sprocket 38 so that it imparts rotation to the spreader unit shafts 16, 20, and 32.

A forward pull of the rope 118 will bring the apex 130 of the triangular wheel 124 onto a cam-like end portion 164 similar to the cammed end 152, whereupon further rotation of the wheel 124 is obtained and a release of the pull-rope 118 permits the apex 126 to come down within a large recess 166 similar to the recess 156, whereupon the action of the spring 54 pulls the chain 40 from its engaging position shown in Figure 4, where it remains after pulling of the rope 118.

The triangular wheel 124 is adapted to remain in the recesses 146 and 162 for the reason that a line drawn between the pivot 138 of the wheel 124 and the apex of the wheel lodged in either of these recesses 146 or 162 is substantially perpendicular to the position of the lever arm 98, which carries the wheel 124.

As previously stated, the roller 104 is adapted to hold the lower strand of the chain 40 up out of engagement with the sprocket 38. However, when the chain 40 is brought down into engagement with the sprocket 38, it is no longer desired that this roller 104 act to hold the chain 40 in an upper position. Hence, when the lever arms 80 turn downwardly about their pivot 62, the arm 110 is also moved downwardly, and its lower end 116, which is the point of connection to the link 114 is moved in a rearward direction, thus causing the holding arm 106 to pivot downwardly about its pivot 108, as best shown in Figure 2.

The wagon portion of the spreader 10 has its sides 26 flared at their upper edges, as shown at 168 in Figure 3. A hood or protective covering 170 is shown depending from the upper end of this flared portion 168 and covers the operating locking mechanism just described. This prevents tampering with the locking mechanism and prevents accidents which would be caused by persons putting their hands in the way of moving parts and prevents foreign objects from entering.

The pull rope 118 is, of course, flexible contrary to all previously used actuating mechanisms for drive-chain releases and engagements. The mechanism used on these prior devices, as heretofore stated, was a rigid link capable of being moved forwardly or rearwardly and locked in either of these positions, whereas now the rope-pull 118 is capable of engaging and disengaging the drive chain 40 merely upon successive forward pulling of the rope. The present locking device need not be limited to use on manure spreaders but may be used on any implement where it is desired to engage or disengage a driving chain.

The intention is to limit the invention only within the scope of the appended claims.

What is claimed is:

1. In a manure-spreader drive, a frame structure, a drive element mounted on said frame structure, a drive member adapted to optionally and operatively engage said drive element, means for maintaining said drive member in remote position from said drive element, and means for shifting and locking said drive member in engaging position with said drive element and in disengaged position by successive pulling of a single rope, said means for shifting and locking comprising a stationary member on said frame structure having irregular cut-out portions in the upper end thereof and a rotatable detent adapted to move with said shifting drive member and engage the cut-out portions in said stationary member.

2. In a manure-spreader drive, a drive element, members to be driven, a flexible drive member adapted to drivingly engage said members to be driven, means for maintaining said flexible drive member in remote position from said drive element, and means for shifting and locking said flexible drive member in engaging position with said drive element and in disengaged position by successive pulling of a single rope, said means for shifting and locking comprising a stationary member having irregular cut-out portions in the upper end thereof and a rotatable triangular wheel having rounded apices and concave sides journaled on and adapted to move with said shifting flexible drive member, and said triangular wheel adapted to lockably engage the cut-out portions in said stationary member.

3. In a manure-spreader drive, a housing structure, a drive-element journaled on said housing structure, a plurality of members to be driven, a flexible drive member adapted to drivingly engage said members to be driven, means for maintaining said flexible drive member in remote position from said drive element, and means for shifting and locking said flexible drive member in engaging position with said drive element and in disengaged position by successive pulling of a single rope, said means for shifting and locking comprising a stationary member attached to said housing structure and having a pair of oppositely-formed identical cut-out portions in the upper edge thereof and a rotatable triangular detent having rounded apices and concave sides, journaled on said shifting flexible drive member and movable therewith adapted to ride over the cut-out upper edge of the stationary member and be optionally locked in either of said cut-out portions.

4. In a manure-spreader drive, a drive element, a housing structure, a plurality of members to be driven, a flexible drive member adapted to drivingly engage said members to be driven, means for maintaining said flexible drive member in remote position from said drive element, and means for shifting and locking said flexible drive member in engaging position with said drive element and in disengaged position by successive pulling of a single rope, said means for shifting and locking comprising a stationary member mounted on said housing structure and having a pair of oppositely-formed identical cut-out portions in the upper edge thereof and a rotatable triangular detent having rounded apices and concave sides mounted on said shifting flexible drive member, said triangular detent movable with said shifting flexible drive member and adapted to ride in the cut-out portions in the upper edge of the stationary member, said cut-out portions having small and large recesses and cammed edges whereby, when an apex of the triangular detent is lodged in a small recess, the detent is prohibited from rotating and upon pulling the single rope the triangular detent strikes the cammed portions and rotates so that an apex of the detent lodges in a large recess and permits the detent to roll over and out of the cut-out portion.

5. In a driving mechanism comprising a frame structure, a drive shaft journaled in said frame structure, a driving sprocket mounted on said drive shaft, an arm pivotally mounted on said frame structure, a sprocket journaled on said pivotally mounted arm, an idler sprocket associated with said frame structure and positioned between the driving sprocket and the sprocket on the arm, an endless chain draped around all the said sprockets, means for lowering and raising said pivotally mounted arm for effecting a lowering and a raising of the one end of said endless chain resulting in engagement and then disengagement of said driving sprocket by said endless chain, means for releasably locking said arm in either lowered or raised position, said last-named means comprising a stationary member integral with said frame structure and having a plurality of irregular cut-out portions, and a rotatable detent member associated with said pivotally mounted arm and adapted to engage the cut-out portions in said stationary member.

6. In a driving mechanism comprising a frame structure, a drive shaft journaled in said frame structure, a driving sprocket mounted on said drive shaft, an arm pivotally mounted on said frame structure, a sprocket journaled on said pivotally mounted arm, an idler sprocket associated with said frame structure and positioned between the driving sprocket and the sprocket on the arm, an endless chain draped around all the said sprockets, means for lowering and raising said pivotally mounted arm for effecting a lowering and a raising of the one end of said endless chain resulting in engagement and then disengagement of said driving sprocket by said endless chain, means for releasably locking said arm in either lowered or raised position, said last-named means comprising a stationary member integral with said frame structure and having a plurality of irregular cut-out portions, a rotatable detent member mounted for rotation on said pivotally mounted arm and adapted to engage the cut-out portions in said stationary member, and resilient means positioned between said arm and a spaced point on said frame structure, said resilient means adapted to normally hold said pivotally mounted arm in non-driving position.

7. In a driving mechanism comprising a frame structure, a drive shaft journaled in said frame structure, a driving sprocket mounted on said drive shaft, an arm pivotally mounted on said frame structure, a sprocket journaled on said pivotally mounted arm, an idler sprocket associated with said frame structure and positioned between the driving sprocket and the sprocket on the arm, an endless chain draped around all the said sprockets, means for lowering and raising said pivotally mounted arm for effecting a lowering and a raising of the one end of said endless chain resulting in engagement and then disengagement of said driving sprocket by said endless chain, means for releasably locking said arm in either lowered or raised position, said last-named means comprising a stationary member on said frame structure and having a plurality of irregular cut-out portions, a rotatable detent member mounted for rotation on said pivotally mounted arm, and adapted to engage the cut-out portions in said stationary member, spring means positioned between said arm and a spaced apart point on said frame structure for normally holding said pivotally mounted arm and its carried endless chain in sprocket disengaged position, and actuating means for locking said chain in all positions comprising a single pull rope.

8. In a manure spreader drive comprising a frame structure, a drive sprocket on said frame structure, an endless chain engaging sprockets to be rotated, a bell-crank pivoted on said frame structure, a sprocket on one arm of said bell-crank and receiving the other end of said chain, a spring attached to the other arm of said bell-crank and to the frame structure whereby said spring normally holds said chain out of engagement with the drive sprocket, means for causing rotation of the bell-crank arm against the action of the spring to effect engagement of the chain with said drive sprocket, locking means for positively locking said bell-crank in either of two positions whereby the chain will be either in drive sprocket engaging or disengaging position, said means for either locking comprising a plate stationary with said frame structure having twin cut-out portions in the upper edge thereof, a triangular shaped wheel journaled on said bell-crank and adapted to engage the cut-out portions in said plate, and actuating means for said locking means comprising a rope which upon successive forward pulling will lodge and dislodge said triangular wheel in either of said twin cut-out portions in the stationary plate.

WILLIAM F. SCHMIED.

REFERENCES CITED

The following references are of record in the file of this patent:

UNITED STATES PATENTS

| Number | Name | Date |
| --- | --- | --- |
| 1,738,168 | Bohmker | Dec. 3, 1929 |
| 2,024,213 | Gettys | Dec. 17, 1935 |
| 871,845 | Wilson | Nov. 26, 1907 |
| 871,867 | Galloway | Nov. 26, 1907 |
| 858,813 | Loos | July 2, 1907 |
| 2,292,952 | MacDonald | Aug. 11, 1942 |
| 439,803 | Laird | Nov. 4, 1890 |
| 1,486,930 | Smith | Mar. 18, 1924 |
| 1,721,691 | Dennis | July 23, 1929 |
| 888,747 | Rude et al. | May 26, 1908 |